(12) United States Patent
Sletten et al.

(10) Patent No.: US 7,952,855 B2
(45) Date of Patent: May 31, 2011

(54) SUBSEA SWITCHGEAR APPARATUS

(75) Inventors: Rune Sletten, Nesoddtangen (NO); Tor-Odd Rønhovd, Bergen (NO); Alf G. Hay, Solbergmoen (NO)

(73) Assignee: Vetco Gray Scandinavia AS, Sandvika (NO)

( * ) Notice: Subject to any disclaimer, the term of this patent is extended or adjusted under 35 U.S.C. 154(b) by 61 days.

(21) Appl. No.: 12/307,368

(22) PCT Filed: Jul. 4, 2007

(86) PCT No.: PCT/IB2007/001830
§ 371 (c)(1),
(2), (4) Date: Jan. 5, 2009

(87) PCT Pub. No.: WO2008/004084
PCT Pub. Date: Jan. 10, 2008

(65) Prior Publication Data
US 2009/0284901 A1 Nov. 19, 2009

(30) Foreign Application Priority Data
Jul. 5, 2006 (NO) .................................. 20063131

(51) Int. Cl.
*H02G 3/08* (2006.01)
(52) U.S. Cl. ........ 361/618; 361/605; 361/611; 218/118; 218/154; 307/149
(58) Field of Classification Search .......... 361/601–605, 361/612, 613, 618, 621, 635, 643, 652; 439/188, 439/190, 199, 589, 944; 218/118, 120, 134, 218/138, 139, 140, 154, 155; 200/48 R, 200/81 R, 51, 51.07–51.09, 51.11–51.13, 200/81.4, 82 A, 82 B, 318, 321, 322, 51 R; 307/11, 38, 39, 17, 29, 36, 151, 149; 405/191; 367/16, 20, 149; 336/57, 58, 90, 94, 55; 174/17 CT, 17 GF, 18, 17 LF, 50, 5 R, 549; 312/223.2, 223.3, 226, 336
See application file for complete search history.

(56) References Cited

U.S. PATENT DOCUMENTS
2,911,919 A 11/1959 Tucker
(Continued)

FOREIGN PATENT DOCUMENTS
GB 1404652 9/1975
(Continued)

OTHER PUBLICATIONS
International Search Report—Nov. 15, 2007.
International Preliminary Report on Patentability—Oct. 6, 2008.
Norwegian Search Report—Feb. 2, 2007.
Sølvik et al., Controlled subsea electric power distribution with SEPDIS, ABB Review, No. 2, 2000.
R. Strømquist, Enablers for deep water & long tie backs, DnV INTSOK, Deep water expert workshop, Aug. 30, 2005.

*Primary Examiner* — Michael V Datskovskiy
(74) *Attorney, Agent, or Firm* — Venable LLP; Eric J. Franklin

(57) ABSTRACT

A subsea switchgear apparatus including a frame, at least one electrical power inlet mounted to the frame, at least one electrical power outlet mounted to the frame, a distribution chamber mounted to the frame, and at least one canister mounted to the frame. The at least one canister includes a chamber accommodating at least one high voltage circuit breaker. Electrical connections are arranged in the distribution chamber for electrically connecting a respective circuit breaker of a canister to an associated power inlet and power outlet of the switchgear apparatus. The chamber of the respective canister is separated from the distribution chamber by a pressure barrier.

17 Claims, 5 Drawing Sheets

U.S. PATENT DOCUMENTS

| | | | |
|---|---|---|---|
| 4,170,000 A * | 10/1979 | Trayer | 337/204 |
| 4,241,379 A | 12/1980 | Olsen | |
| 4,324,534 A | 4/1982 | Sharkey | |
| 4,767,351 A * | 8/1988 | Patel et al. | 439/363 |
| 6,420,976 B1 * | 7/2002 | Baggs et al. | 340/853.3 |
| 6,867,364 B2 * | 3/2005 | Hafskjold et al. | 174/50 |
| 6,873,063 B1 * | 3/2005 | Appleford et al. | 307/149 |
| 6,985,061 B2 * | 1/2006 | Hafskjold et al. | 336/90 |
| 7,080,996 B2 * | 7/2006 | Ostergaard | 439/188 |
| 7,176,589 B2 * | 2/2007 | Rouquette | 307/17 |
| 7,247,804 B2 | 7/2007 | Eriksson et al. | |
| 7,488,916 B2 * | 2/2009 | Muench et al. | 218/154 |
| 2004/0149446 A1 * | 8/2004 | Appleford et al. | 166/366 |
| 2007/0241080 A1 * | 10/2007 | Stoving et al. | 218/118 |
| 2009/0200035 A1 * | 8/2009 | Bjerkreim et al. | 166/335 |
| 2009/0226262 A1 * | 9/2009 | Karstad et al. | 405/191 |

FOREIGN PATENT DOCUMENTS

| | | |
|---|---|---|
| NO | 321080 | 3/2006 |
| WO | WO 01/20746 | 3/2001 |
| WO | WO 02/41336 | 5/2002 |
| WO | WO 02/093715 | 11/2002 |
| WO | WO 03/081728 | 10/2003 |

* cited by examiner

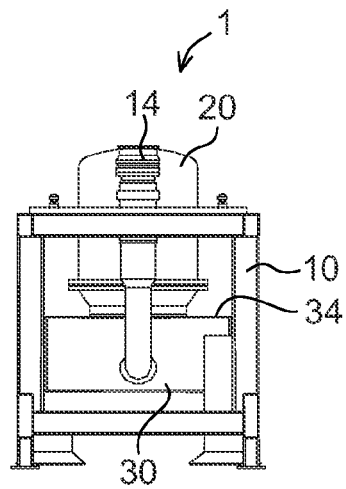
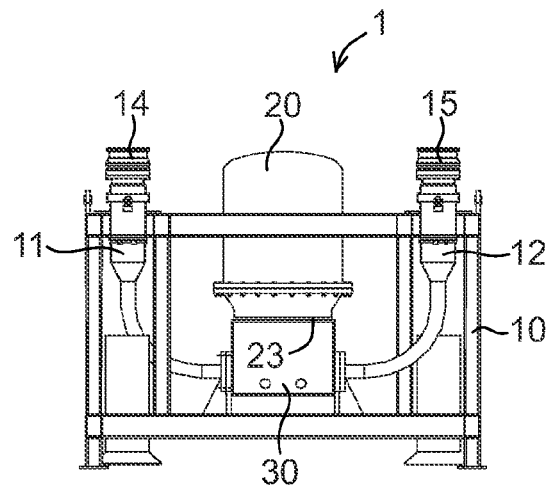
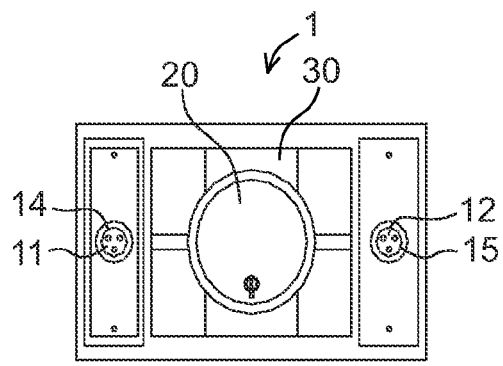
Fig 3a
Fig 3c
Fig 3b

SUBSEA SWITCHGEAR APPARATUS

CROSS-REFERENCE TO RELATED APPLICATIONS

This application claims priority to Norwegian patent application 20063131 filed 5 Jul. 2006 and is the national phase under 35 U.S.C. §371 of PCT/IB2007/001830, filed 4 Jul. 2007.

FIELD OF THE INVENTION AND PRIOR ART

The present invention relates to a subsea switchgear apparatus.

The inventive subsea switchgear apparatus comprises one or several circuit breakers to be used for subsea applications. Application areas are typically in a subsea plant for extraction and/or processing of well fluid in the form of oil or natural gas from a subsea well where electrical power is needed and for offshore power generation.

SUMMARY OF THE INVENTION

The object of the present invention is to provide a subsea switchgear apparatus of new and advantageous design.

The inventive subsea switchgear apparatus comprises:
  a frame,
  at least one electrical power inlet mounted to the frame,
  at least one electrical power outlet mounted to the frame,
  a distribution chamber mounted to the frame,
  at least one canister, which is mounted to the distribution chamber and comprises a chamber accommodating at least one high voltage circuit breaker, and
  electrical connections arranged in the distribution chamber for electrically connecting the respective circuit breaker of a canister to the associated power inlet and power outlet of the switchgear apparatus;
wherein the chamber of the respective canister is separated from the distribution chamber by a pressure barrier.

The pressure barrier between the distribution chamber and the chamber of a canister facilitates maintenance, repair and replacement of a circuit breaker accommodated in said chamber of the canister. Furthermore, the respective canister will protect the circuit breaker or circuit breakers disposed therein in case a circuit breaker of another canister is subjected to a fault According to a preferred embodiment of the invention, the respective canister constitutes a pressure vessel, the chamber of the canister being filled with gas.

According to another embodiment of the invention, each canister constitutes a separate module that is releasably mountable to the distribution chamber. Consequently, it will be possible to remove a canister together with its circuit breaker or circuit breakers from the remaining parts of the switchgear apparatus when a circuit breaker of the canister is to be subjected to replacement or repair (when the switchgear apparatus is taken out of normal operation). Furthermore, by the arrangement of circuit breakers in canister modules, the subsea switchgear apparatus becomes very flexible and it will be possible to easily adapt the switchgear apparatus as needed to the prevailing operating conditions.

Further advantages as well as advantageous features of the inventive subsea switchgear apparatus will appear from the following description.

BRIEF DESCRIPTION OF THE DRAWINGS

With reference to the appended drawings, a specific description of preferred embodiments of the invention cited as examples follows below. In the drawings:

FIG. 3b is a schematic planar view from above of the switchgear apparatus of FIG. 3a, FIG. 3c is a schematic frontal view of the switchgear apparatus of FIG. 3a, FIG. 4 is a schematic sectional view of a canister and a distribution chamber forming part of the switchgear apparatus of FIGS. 1-3.

DETAILED DESCRIPTION OF PREFERRED EMBODIMENTS OF THE INVENTION

Figure 1A:
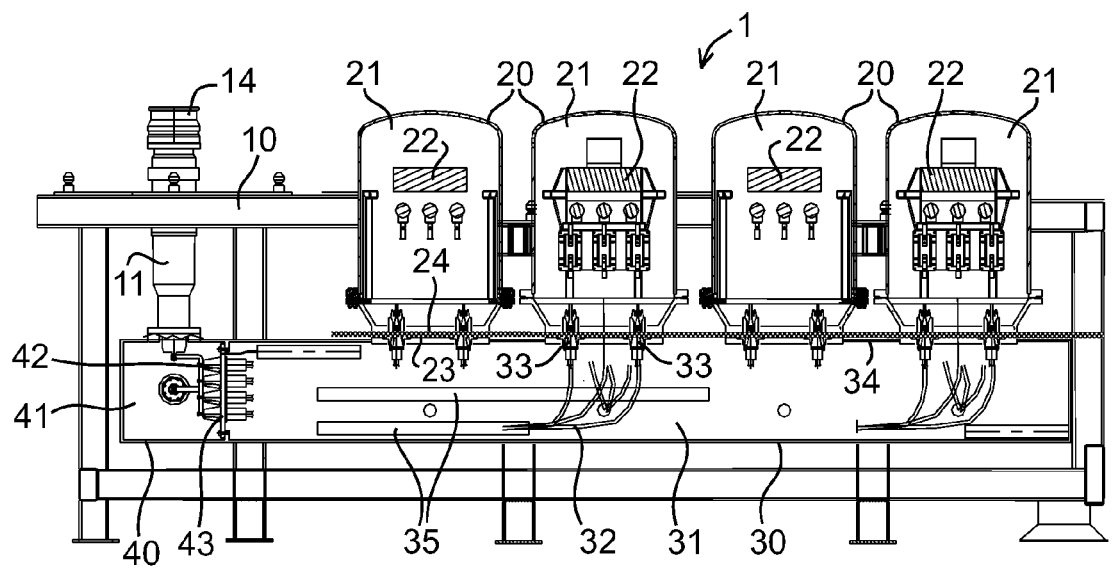
FIG. 1a is a schematic longitudinal sectional view of a switchgear apparatus according to a first embodiment of the present invention.
Figure 1B:
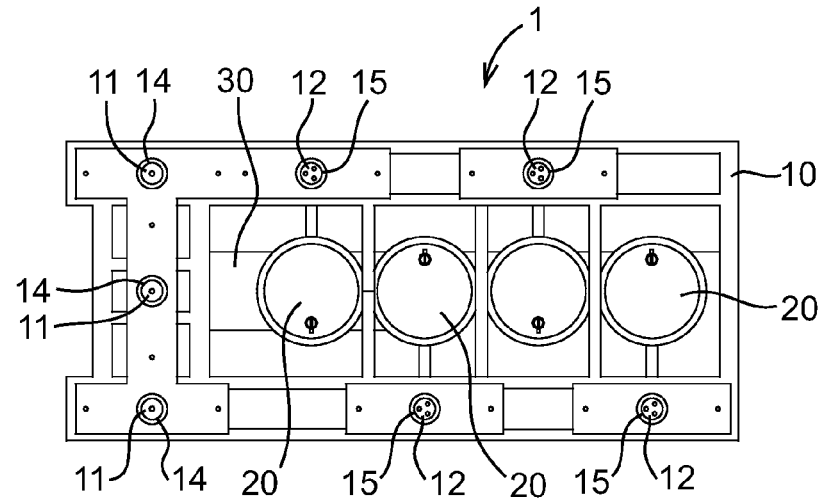
FIG. 1b is a schematic planar view from above of the switchgear apparatus of FIG. 1a, FIG. 1c is a schematic frontal view of the switchgear apparatus of FIG. 1a, FIG. 2a is a schematic longitudinal sectional view of a switchgear apparatus according to a second embodiment of the present invention.
Figure 1C:
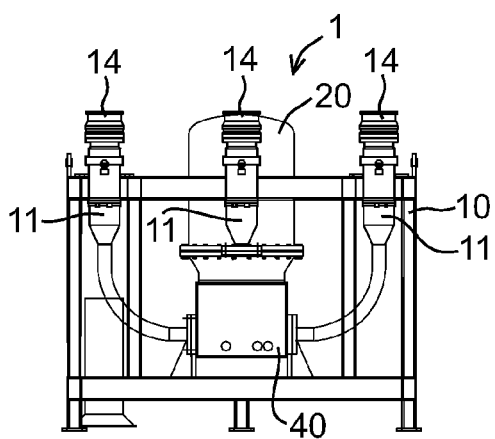

FIGS. 1a-1c, 2a-2c, 3a-3c, 5a-5b and 6 illustrate very schematically subsea switchgear apparatuses 1 according to different embodiments of the present invention.

The inventive switchgear apparatus 1 comprises:
  a frame 10,
  at least one electrical power inlet 11 mounted to the frame 10,
  at least one electrical power outlet 12 mounted to the frame 10,
  a distribution chamber 31 mounted to the frame 10,
  at least one canister 20, which is mounted to the distribution chamber 31 and comprises a chamber 21 accommodating at least one high voltage circuit breaker 22, and
  electrical connections 32 arranged in the distribution chamber 31 for electrically connecting the respective circuit breaker 22 of a canister 20 to the associated power inlet 11 and power outlet 12 of the switchgear apparatus 1.

In the illustrated embodiments, the frame 10 is designed as a framework. The different parts of the switchgear apparatus 1 are supported by this frame 10, which for instance may rest on the seabed when the switchgear apparatus is installed at a subsea plant.

The switchgear apparatus 1 may be provided with any suitable number of canisters 20. In the embodiments illustrated in FIGS. 1a-1c and FIG. 6, the switchgear apparatus 1 comprises four canisters 20, each of which accommodating one circuit breaker 22. In the embodiment illustrated in FIGS. 2a-2c, the switchgear apparatus 1 comprises two canisters 20, each of which accommodating one circuit breaker 22. In the embodiment illustrated in FIGS. 3a-3c, the switchgear apparatus 1 comprises only one canister 20, which accommodates one circuit breaker 22. If so desired, two or more circuit breakers 22 may be accommodated in a separate canister 20. In the embodiment illustrated in FIGS. 5a and 5b, the switchgear apparatus 1 comprises only one canister 20, which accommodates four circuit breakers 22. The respective circuit breaker 22 is mounted to a support frame 25 (see FIG. 4) arranged in the chamber 21 of the associated canister 20.

The chamber 21 of the respective canister 20 is separated from the distribution chamber 31 by a pressure barrier 23. The medium contained in the chamber 21 of a canister 20 is separated from the medium contained in the distribution chamber 31 by said pressure barrier 23.

The respective canister 20 constitutes a pressure vessel and the chamber 21 of the canister 20 is suitably filled with gas. Preferably, the pressure of the gas within the chamber 21 of the canister 20 is essentially equal to atmospheric pressure. In the illustrated embodiments, the pressure barrier 23 between the chamber 21 of the respective canister 20 and the distribution chamber 31 is formed by a bottom wall 24 of the canister. A canister 20 of suitable design is illustrated in closer detail in FIG. 4.

Figure 4:
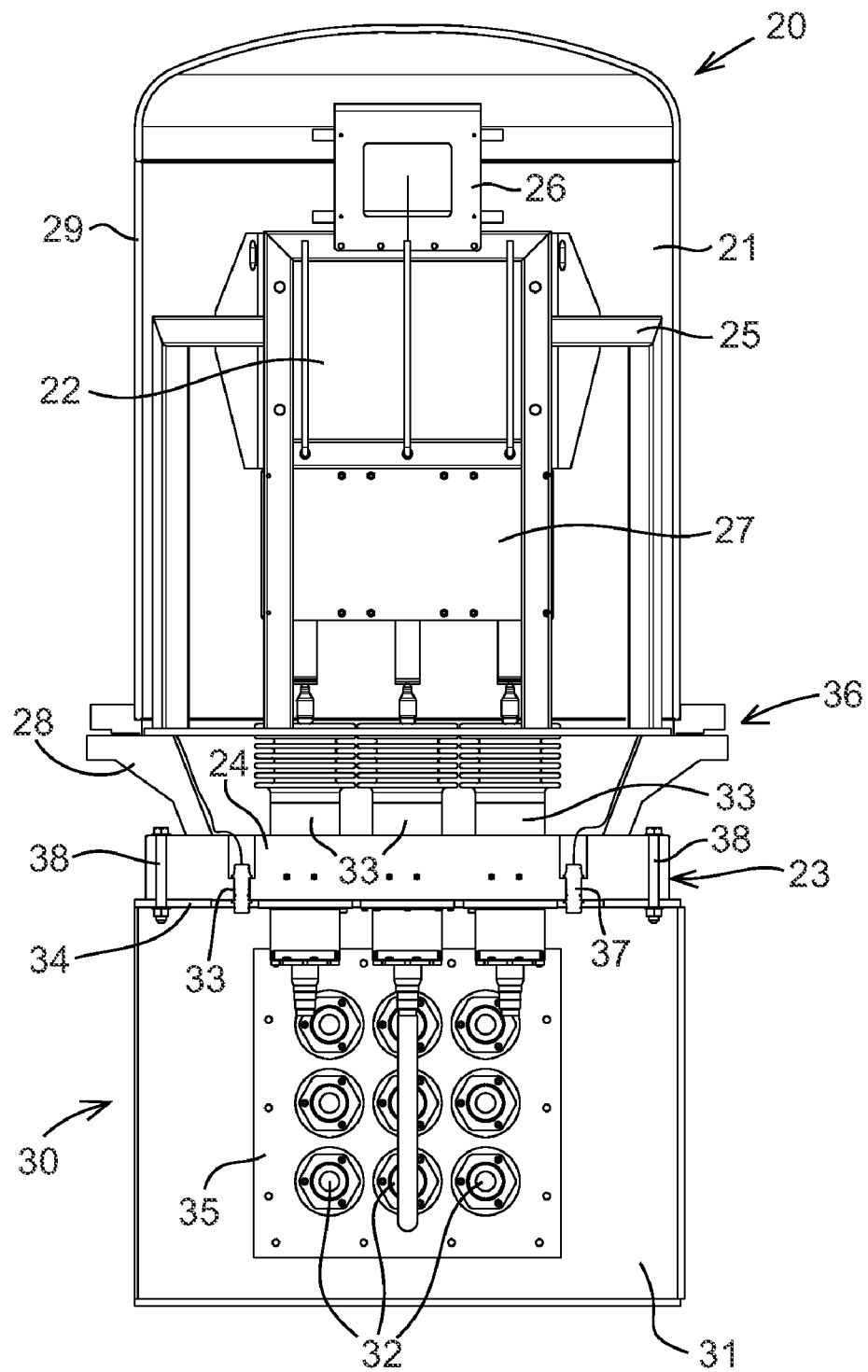

In the illustrated embodiments, the circuit breaker 22 of the respective canister 20 is electrically connected to the associated electrical connections 32 of the distribution chamber 31 via high voltage penetrators 33 extending through the pressure barrier 23 between the canister chamber 21 and the distribution chamber 31. Each canister 20 is provided with a control unit 26 for controlling the associated circuit breaker 22 and a sensor unit 27, as illustrated in FIG. 4. Connections for external control cables may be located on the frame 10, said connections being connected to the control unit 26 via a suitable conductor piping extending into the distribution chamber 31 and further via low voltage penetrators 37 extending through the pressure barrier 23 between the canister chamber 21 and the distribution chamber 31. Each canister 20 suitably constitutes a separate module that is releasably mountable to the distribution chamber 31.

In the embodiments illustrated in FIGS. 1a-1c, 2a-2c, 3a-3c, 4 and 6, the respective canister 20 is mounted to the distribution chamber 31 with the canister resting on the upper wall 34 of distribution chamber 31 via the bottom wall 24 of the canister. In these illustrated embodiments, each canister 20 comprises a pressure shell formed by:
- a bottom plate 24 (which not necessarily is flat), which forms the above-indicated bottom wall and which is realeasably secured to the upper wall 34 of the distribution chamber 31 by bolts 38,
- a cone-shaped lower part 28 rigidly attached to the bottom plate 24, and
- an upper part 29 forming a cover and realeasably secured to the lower part 28 via a flange joint 36.

In this case, all the equipment within the respective canister 20 is suitably mounted to the bottom plate 24 and/or to the lower part 28.

The electrical connections 32 of the distribution chamber 31 may be electrical cables, which are secured to cable racks 35 arranged in the distribution chamber 31.

The distribution chamber 31 is preferably filled with a dielectric medium, such as oil. The distribution chamber 31 is with advantage volume compensated, preferably to the ambient sea, by means of any suitable volume compensating means. Furthermore, the distribution chamber 31 is with advantage pressure balanced, preferably against ambient sea water pressure, by means of any suitable pressure balancing means. This implies that the distribution chamber 31 may be a soft tank. Different types of volume compensating means and pressure balancing means that are suitable for subsea use and that may be used for the distribution chamber are well known to persons skilled in the art and will therefore not be more closely described is this description. The distribution chamber 31 suitably forms part of a separate distribution chamber module 30 that is releasably mountable to the frame 10.

In the embodiments illustrated in FIGS. 1a-1c, 2a-2c, 3a-3c and 6, the subsea switchgear apparatus 1 comprises an inlet chamber 41, which accommodates a busbar rail 42 connected to high voltage bushings 43 arranged between the inlet chamber 41 and the distribution chamber 31. The respective power inlet 11 is connected to the associated electrical connections 32 of the distribution chamber 31 via said busbar rail 42 and said high voltage bushings 43. The inlet chamber 41 is preferably filled with a dielectric medium, such as oil. The inlet chamber 41 is with advantage volume compensated to the distribution chamber 31 by means of any suitable volume compensating means. Furthermore, the inlet chamber 41 is with advantage pressure balanced against the distribution chamber pressure by means of any suitable pressure balancing means. This implies that the inlet chamber 41 may be a soft tank. Different types of volume compensating means and pressure balancing means that are suitable for subsea use and that may be used for the inlet chamber are well known to persons skilled in the art and will therefore not be more closely described is this description. The respective bushing 43 between the inlet chamber 41 and the distribution chamber 31 may be a high voltage oil/gas bushing of standard industrial type modified and adapted for use in high pressure environment when these chambers are so designed that the differential pressure between them equals zero. The bushings are fixed to a seal plate which is releasably mounted to a wall of the distribution chamber 31, and which constitutes a part of the cable rack 35.

Figure 6:
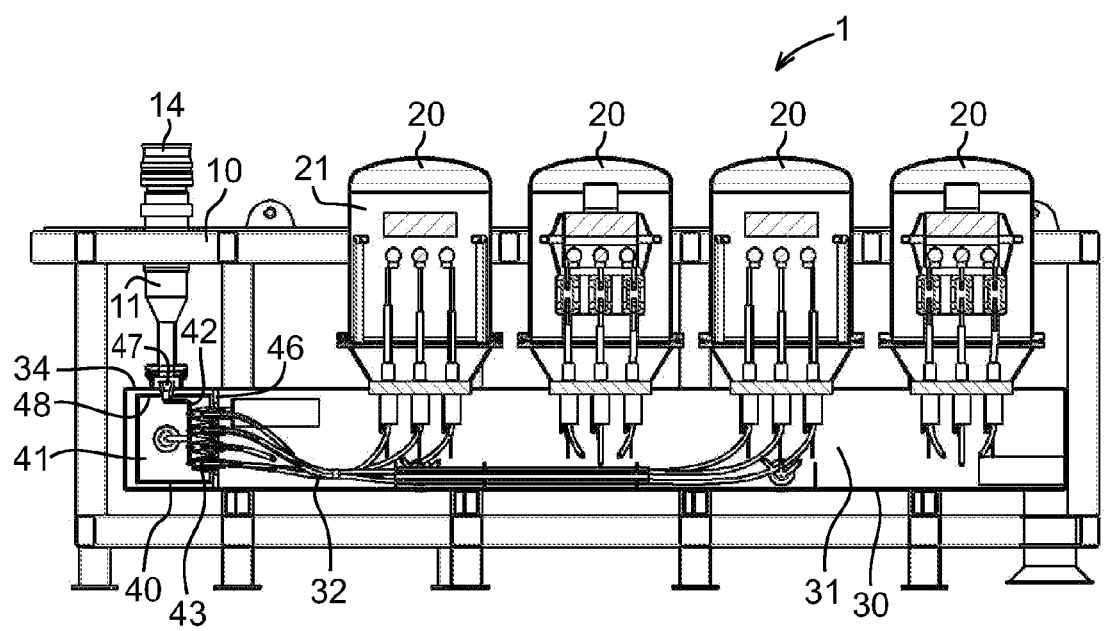
FIG. 6 is a schematic longitudinal sectional view of a switchgear apparatus according to a fifth embodiment of the present invention.

The inlet chamber 41 suitably forms part of a separate inlet chamber module 40 that is mounted inside the distribution chamber 31, as illustrated in FIG. 6. In the embodiment illustrated in FIG. 6, the inlet chamber module 40 is mounted to a holder 46 arranged inside the distribution chamber 31. The respective power inlet 11 is connected to a busbar rail 42 in the inlet chamber 41 via a high voltage bushing 47 extending across an external wall 34 of the distribution chamber 41 and an external wall 48 of the inlet chamber 41. By this arrangement of the inlet chamber module 40 inside the distribution chamber 31, the busbar rails 42 and other electrical components accommodated in the inlet chamber 41 are protected from the ambient sea water by a double barrier. Thus, if sea water would leak through the first barrier formed by the walls of the distribution chamber 31, the second barrier formed by the walls of the inlet chamber 41 will prevent the sea water from entering the inlet chamber 41 and coming into contact with the electrical components accommodated therein, and the normal operation of the switchgear apparatus may thereby proceed despite the ingress of sea water.

Figure 2A:
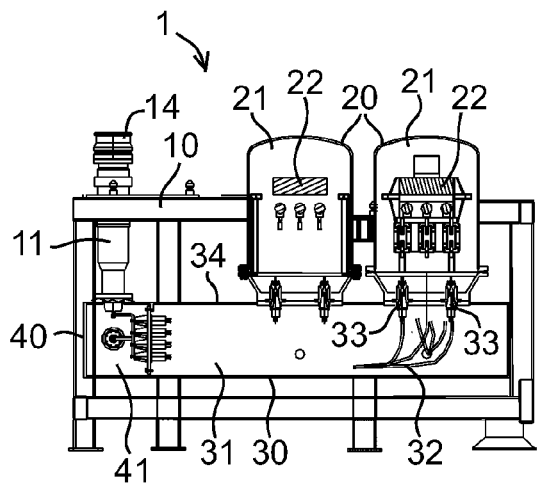
FIG. 2b is a schematic planar view from above of the switchgear apparatus of FIG. 2a, FIG. 2c is a schematic frontal view of the switchgear apparatus of FIG. 2a, FIG. 3a is a schematic longitudinal sectional view of a switchgear apparatus according to a third embodiment of the present invention.
Figure 2C:
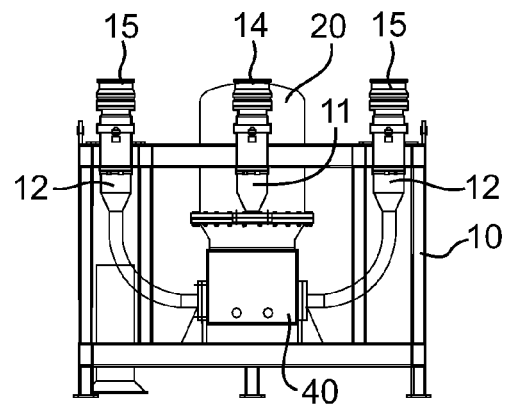
Figure 2B:
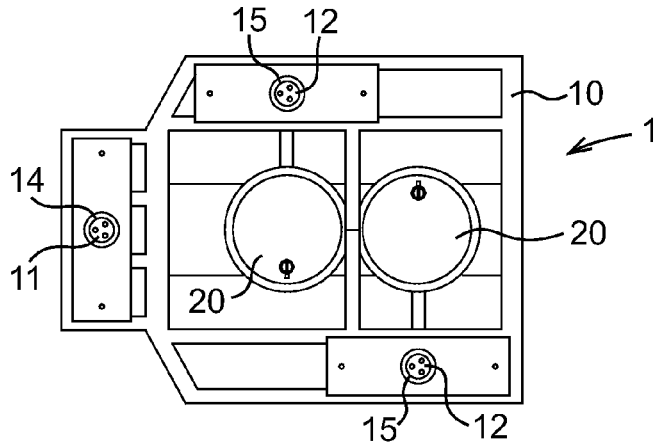
Figure 5A:
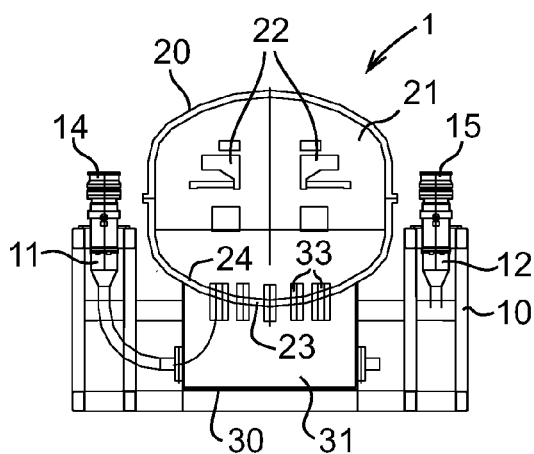
FIG. 5a is a schematic sectional view of a switchgear apparatus according to a fourth embodiment of the present invention.
Figure 5B:
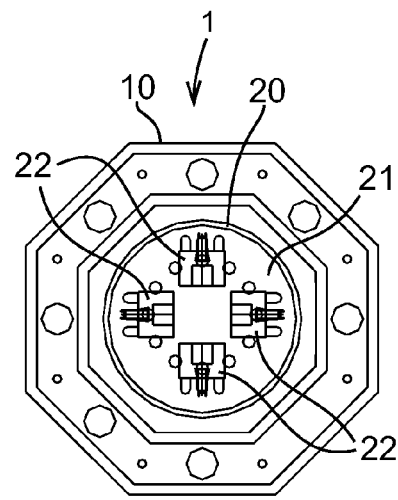
FIG. 5b is a schematic planar view from above of the switchgear apparatus of FIG. 5a with the canister of the switchgear apparatus shown in cross section.

The inlet chamber 41 may alternatively form part of a separate inlet chamber module 40 that is releasably mountable to the frame 10 adjacent to the distribution chamber module 30, as illustrated in FIGS. 1a and 2a.

The high current parts accommodated in the distribution chamber 31 and/or in the inlet chamber 41 are suitably located in dielectric oil in order to provide efficient cooling thereof.

The respective power inlet 11 comprises an electrical inlet connector 14 secured to the frame 10 for receiving a corresponding connector of a power supply line. In the embodiment illustrated in FIGS. 1a-1c, the switchgear apparatus 1 is provided with three inlet connectors 14 in the form of 1-pin connectors. In the embodiments illustrated in FIGS. 2a-2c and 3a-3c, the switchgear apparatus 1 is provided with one single inlet connector 14 in the form of a 3-pin connector.

The respective power outlet 12 comprises an electrical outlet connector 15 secured to the frame 10 for receiving a corresponding connector of a power supply line. Each circuit breaker 22 is associated with its own outlet connector 15. In the illustrated embodiments, the respective outlet connector 15 has the form of a 3-pin connector. Alternatively, space may be provided for 3 off single pin connectors.

The switchgear apparatus is suitably so designed that the electrical power inlets and electrical power outlets are designed for zero-differential pressure, which will make it possible to use standard subsea electrical connectors.

Standard industrial application circuit breakers and measurement systems may be used in the inventive switchgear apparatus.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A subsea switchgear apparatus, the switchgear apparatus comprising:
    a frame,
    at least one electrical power inlet mounted to the frame,
    at least one electrical power outlet mounted to the frame,
    a distribution chamber mounted to the frame and comprising electrical connections,
    at least one canister, which is mounted to the distribution chamber and comprises a chamber accommodating at least one high voltage circuit breaker,
    electrical connections arranged in the distribution chamber for electrically connecting a respective circuit breaker of a canister to the associated power inlet and power outlet of the switchgear apparatus;
    an inlet chamber,
    a busbar rail arranged in the inlet chamber,
    high voltage bushings connected to the busbar rail, the high voltage bushings being arranged between the inlet chamber and the distribution chamber,
    a power inlet connected to the electrical connections of the distribution chamber via the busbar rail and said high voltage bushings, and
    a pressure barrier separating the chamber of a respective canister from the distribution chamber.

2. The subsea switchgear apparatus according to claim 1, wherein the respective canister comprises a pressure vessel, the chamber of the canister being filled with gas.

3. The subsea switchgear apparatus according to claim 2, wherein a pressure of the gas within the chamber of the canister is essentially equal to atmospheric pressure.

4. The subsea switchgear apparatus according to claim 1, wherein the pressure barrier between a canister chamber and the distribution chamber comprises a bottom wall of the canister.

5. The subsea switchgear apparatus according to claim 1, wherein the respective circuit breaker of a canister is electrically connected to associated electrical connections of the distribution chamber via penetrators extending through the pressure barrier between the canister chamber and the distribution chamber.

6. The subsea switchgear apparatus according to claim 1, wherein each canister comprises a separate module that is releasably mountable to the distribution chamber.

7. The subsea switchgear apparatus according to claim 1, wherein the distribution chamber forms part of a separate distribution chamber module that is releasably mountable to the frame.

8. The subsea switchgear apparatus according to claim 1, wherein the distribution chamber is filled with a dielectric medium.

9. The subsea switchgear apparatus according to claim 1, wherein the distribution chamber is volume compensated.

10. The subsea switchgear apparatus according to claim 1, wherein the distribution chamber is pressure balanced.

11. The subsea switchgear apparatus according to claim 1, wherein the inlet chamber forms part of a separate inlet chamber module that is releasably mountable to the frame.

12. The subsea switchgear apparatus according to claim 1, wherein the inlet chamber forms part of a separate inlet chamber module that is mounted inside the distribution chamber.

13. The subsea switchgear apparatus according to claim 1, wherein the inlet chamber is filled with a dielectric medium.

14. The subsea switchgear apparatus according to claim 1, wherein the inlet chamber is volume compensated to the distribution chamber.

15. The subsea switchgear apparatus according to claim 1, wherein the inlet chamber is pressure balanced against the distribution chamber pressure.

16. The subsea switchgear apparatus according to claim 1, wherein the respective power inlet comprises an electrical inlet connector secured to the frame for receiving a corresponding connector of a power supply line.

17. The subsea switchgear apparatus according to claim 1, wherein the respective power outlet comprises an electrical outlet connector secured to the frame for receiving a corresponding connector of a power supply line.

* * * * *